United States Patent [19]
Verbrugge

[11] 4,358,573
[45] Nov. 9, 1982

[54] WAXY MALEIC ANHYDRIDE ALPHA OLEFIN TERPOLYMERS

[75] Inventor: Calvin J. Verbrugge, Racine County, Wis.

[73] Assignee: S. C. Johnson & Son, Inc., Racine, Wis.

[21] Appl. No.: 268,432

[22] Filed: May 29, 1981

[51] Int. Cl.$^3$ .................................... C08F 222/04
[52] U.S. Cl. .................................... 526/272
[58] Field of Search .................................... 526/272

[56] References Cited

U.S. PATENT DOCUMENTS 3,706,704 12/1972 Heilman .................................... 526/272

Primary Examiner—Joseph L. Schofer
Assistant Examiner—Peter F. Kulkosky

[57] ABSTRACT

Terpolymers of maleic anhydride and mixtures of lower alkenes and higher alkenes have waxy properties, yet are readily dispersible and have low viscosities.

7 Claims, No Drawings

WAXY MALEIC ANHYDRIDE ALPHA OLEFIN TERPOLYMERS

BACKGROUND OF THE INVENTION

This invention relates to terpolymers of maleic anhydride with mixed alpha olefins. More particularly, this invention relates to waxy terpolymers of maleic anhydride, at least one lower 1-alkene, and at least one higher 1-alkene.

Maleic anhydride alpha olefin copolymers are well-known in the art, as exemplified by U.S. Pat. Nos. 3,553,177, 3,560,455, 3,560,456 and 3,560,457. Each of these patents describes a copolymer of maleic anhydride with a specific alpha olefin such as a $C_{12}$ alpha olefin, $C_{16}$ to $C_{18}$ alpha olefins, and a $C_{30}+$ alpha olefin. Each of the alpha olefins described in the prior art as exemplified by the above noted patents has particular uses. The copolymers of maleic anhydride - $C_{30}+$ alpha olefin and maleic anhydride - $C_{18}$-$C_{20}$ alpha olefin, are waxy materials, but have high viscosity which limits the utility of these materials.

The copolymers of $C_6$-$C_{10}$ alpha olefins with maleic anhydride are also known, as shown by U.S. Pat. No. 3,488,311. However, these copolymers, although having low viscosity, do not have a waxy character.

BRIEF DESCRIPTION OF THE INVENTION

It has now been surprisingly found that terpolymers of maleic anhydride, at least one lower 1-alkene and at least one higher 1-alkene in specified monomer ratios, have desirable waxy properties enabling them to be used in a variety of end uses, including mold release agents, slip agents, additives to floor polishes and the like, and desirable solubility and viscosity characteristics which enable the polymers and products containing the polymer to flow and coat the above noted surfaces. The instant invention requires that 0.1–0.8 moles of the higher 1-alkene be replaced with lower 1-alkene in a copolymer where approximately equi-molar amounts of maleic anhydride are reacted with the mixed 1-alkenes.

OBJECTS AND ADVANTAGES

It is, therefore, the object of the present invention, to provide waxy maleic anhydride 1-alkene terpolymers having stable low viscosities.

It is a further object of the present invention to provide maleic anhydride 1-alkene polymers which can be readily solubilized.

It is a further object of the present invention to provide maleic anhydride 1-alkene polymers which have desirable waxy attributes suitable for use in release coatings while having a manageable and suitable viscosity at normally applied concentrations.

Still further objects and advantages of the present invention will become more apparent from the following, more detailed description thereof.

DETAILED DESCRIPTION OF THE INVENTION

The terpolymers of maleic anhydride, lower 1-alkene and higher 1-alkene of the present invention comprise from 49–60 mole percent maleic anhydride, 10–40 mole percent of a lower 1-alkene and 40–10 percent of an alpha olefin having 18 or more carbon atoms in its carbon chain.

It has been found, surprisingly, that the incorporation of a lower 1-alkene as a termonomer in a polymer of maleic anhydride and higher 1-alkene increases the solubility of the resulting polymers and reduces the viscosity of solutions of the polymer, but does not substantially change the waxy properties of the maleic anhydride higher 1-alkene copolymers. This is especially surprising in view of the fact that the maleic anhydride - lower 1alkene alpha olefin copolymers have substantially no waxy properties themselves, and are not suitable for use as slip agents.

As noted above, the terpolymers of the present invention include maleic anhydride. In addition to maleic anhydride, certain anhydrides can be utilized in formation of the terpolymers of the present invention, such as methymaleic anhydride, dimethyl maleic anhydride, fluoromaleic anhydride, methyethyl maleic anhydride, and the like. It is preferred that the anhydride be substantially free of acid and the like before polymerization. The preferred anhydride is maleic anhydride.

The second component of the terpolymers of the present invention is a higher 1-alkene, i.e. a 1-alkene having at least 18 carbon atoms. These materials may be either pure materials such as 1-octadecene, or they may be mixtures of various higher 1-alkenes such as mixed $C_{20}$, $C_{22}$ and $C_{24}$ 1-alkenes and the like. Suitable 1-alkenes for use in the terpolymers in the present invention include the following:

1-octadecene
1-eicosene
1-docosene
1-tetracosene
1-hexacosene
1-octacosene
1-triacontene
1-dotriacontene
1-tetratriacontene
1-hexatriacontene
1-octatriacontene
1-tetracontene
1-dotetracontene
1-tetratetracontene
1-hexatetracontene
1-octatetracontene
1-pentacontene
1-hexacontene
and mixtures thereof.

Although substantially pure higher 1-alkenes can be used, it is preferred for economic reasons to use mixtures of these higher 1-alkenes. A typical mixture is a mixture of $C_{30}+$ 1-alkenes as described in U.S. Pat. No. 3,553,177. As indicated, this process produces primarily even chain length alpha olefins. Another mixture of higher 1-alkenes is a mixture of $C_{20}$ to $C_{24}$ 1-alkenes. This mixture is commercially available from Gulf Oil Company. The higher 1-alkenes should be essentially monoolefinic as diolefins cause gel formation and cross-linking. Small amounts of diolefins, typically less than 2 percent, can be tolerated as an impurity in the higher 1-alkene monomer.

The preferred higher 1-alkenes are Eicosene, $C_{20}$-$C_{24}$ mixtures, $C_{24}$-$C_{28}$ mixtures and $C_{30}+$ mixtures.

The third monomer in the terpolymers of the present invention, is a lower 1-alkene, having from 4 to 16 carbon atoms. Suitable 1-alkenes include:

1-butene
1-pentene
1-hexene
1-heptene 1-octene
1-nonene
1-decene
1-dodecene
1-tetradecene
1-hexadecene
2-methyl-1-butene
3,3-dimethyl-1-pentene
2-methyl-1-heptene
4,4-dimethyl-1-heptene
3,3-dimethyl-1-hexene
4-methyl-1-pentene
and the like. Mixtures of the above materials can be utilized. It is preferred to utilize straight chain 1-alkenes having from 4 to 10 carbon atoms, and accordingly, 1-butene, 1-pentene, 1-hexene, 1-heptene, 1-octene, 1-nonene, and 1-decene, and mixtures thereof are preferred. As with the higher 1-alkenes, these materials should be substantially free of diolefin as an impurity, although small amounts, i.e. less than 2 percent, can be present without causing undue gel formation and crosslinking in the resulting terpolymers. Also as noted above, either single materials, i.e. 1-octene, 1-decene, etc. can be used, or mixtures of these materials may be utilized.

Each of the above three monomers must be present in the terpolymers of the present invention, in certain specific amounts in order to achieve the desired result. In other words, if too much lower 1-alkene is included in the copolymers, the waxy properties of these materials is substantially reduced, while if insufficient lower 1-alkene is not utilized, the viscoscity of the resulting terpolymers is much too high to be conveniently utilized.

As is well-known in the art, polymers including maleic anhydride are essentially alternating polymers, with maleic anhydride units alternating between random olefin groups. This alternating backbone occurs without regard to the relative ratio of the reactants. This phenomenon is described in various patents noted below relating to the processes of preparing the polymers of the instant application. Accordingly, the terpolymers of the present invention will contain from 49 to 60 mole percent of maleic anhydride. Under some conditions, such as very high initiator levels, it is possible to include some small excess of maleic anhydride relative to olefin in the resulting polymers. The amount of lower 1-alkene present in the terpolymers of the present invention is from 10 to 40 mole percent, while the amount of higher 1-alkene is similarly from 10 to 40 mole percent. The preferred terpolymers of the present invention include from 49 to 55 mole percent of maleic anhydride, 20 to 40 mole percent lower 1-alkene, and 10 to 30 percent higher 1-alkene.

The polymers of the present invention may be prepared by any conventional polymerization process including polymerization processes as set forth in U.S. Pat. No. Re. 28,475 as well as U.S. Pat. No. 3,553,177, U.S. Pat. Nos. 3,560,455, 3,560,456, 3,560,457 and 3,488,311.

The terpolymers of the present invention are generally low molecular weight materials, having a number average molecular weight within the range of from 3,000–15,000 and preferably within the range of from 3,000–10,000.

One unexpected benefit of the terpolymers of the present invention is the ease with which solubilization of these polymers occurs. Although it is possible at low solids, i.e., 5% ammonia solutions, to obtain a viscoscity of from 4–5 cps with all terpolymers of maleic anhydride and a higher and lower 1-alkene, for those terpolymers outside the terpolymers of the present invention the time required for the solubilization and viscoscity. stabilization is often in excess of several hours and sometimes even in excess of a month. Furthermore, a substantial amount of heat is required to achieve this solubilization even over an extended period of time. Obviously, this high temperature extended solubilization period is not satisfactory or acceptable for commercially useful products which should be present in solution at relatively low and stable viscosities. Furthermore, in increased solids, i.e. 25%, terpolymers having a higher 1-alkene content form a gel which becomes so viscous that these materials are impossible and impractical to process. On the other hand, the terpolymers of the present invention go directly to a fluid system without passing through the gel region. This greatly increases the flexibility in preparing solutions of these terpolymers for end uses.

The following examples will show the preparation of representative terpolymers of the present invention. In the following examples, all parts and percentages unless otherwise noted are on a mole percent basis, and all temperatures are in degrees Centigrade.

EXAMPLE 1

To a 4-necked 2-liter flask is charged 28 g (0.2 mole) of 1-decene and 246.4 g (0.8 mole) of $C_{20-24}$ alpha olefin. To a dropping funnel equipped with heating tape is charged 98 g (1.0 mole) of solid maleic anhydride. To a second dropping funnel is added 5.85 g of di-T-butyl peroxide (DTBP). The flask is heated to 160° C. and upon attainment of this temperature, a simultaneous dropwise addition of maleic anhydride and DTBP is carried out over a period of one hour.

Upon completion of the addition, the flask is held at 160° C. for one hour. The hot contents are then poured into a can or tray to cool. The terpolymer produced has a weight average molecular weight ($M_w$) of 7600 and a number average molecular weight ($M_n$) of 4250.

EXAMPLE 2

The series of polymers shown in Table I were prepared using the procedure of Example 1. The values in Table 1 are molar amounts.

TABLE I

| Run | 1-Decene | Maleic Anhydride | $C_{20-24}$ 1-Alkene | $C_{30+}$ 1-Alkene |
|---|---|---|---|---|
| A | 1.0 | 1.0 | — | — |
| B | 0.9 | 1.0 | 0.1 | — |
| C | 0.8 | 1.0 | 0.2 | — |
| D | 0.7 | 1.0 | 0.3 | — |
| E | 0.6 | 1.0 | 0.4 | — |
| F | 0.5 | 1.0 | 0.5 | — |
| G | 0.4 | 1.0 | 0.6 | — |
| H | 0.3 | 1.0 | 0.7 | — |
| I | 0.2 | 1.0 | 0.8 | — |
| J | 0.1 | 1.0 | 0.9 | — |
| K | 0.0 | 1.0 | 1.0 | — |
| L | 1.0 | 1.0 | — | 0.0 |
| M | 0.9 | 1.0 | — | 0.1 |
| N | 0.8 | 1.0 | — | 0.2 |
| O | 0.7 | 1.0 | — | 0.3 |
| P | 0.6 | 1.0 | — | 0.4 |
| Q | 0.5 | 1.0 | — | 0.5 |
| R | 0.4 | 1.0 | — | 0.6 |
| S | 0.3 | 1.0 | — | 0.7 |
| T | 0.2 | 1.0 | — | 0.8 |
| U | 0.1 | 1.0 | — | 0.9 |

TABLE I-continued

| Run | 1-Decene | Maleic Anhydride | C20-24 1-Alkene | C30+ 1-Alkene |
|-----|----------|------------------|-----------------|---------------|
| V   | 0.0      | 1.0              | —               | 1.0           |

Runs A, B, J, K, L, M, U, and V are comparative examples. Each polymer was pulverized to a fine powder in a blender for use in Example 3.

EXAMPLE 3

Example 2 was used in a kinetic experiment to determine the time required for an ammonia cut of the polymer to come to an equilibrium viscosity. Sufficient material was weighed to provide one quart of 5% by weight polymer. The powdered polymer, ammonium hydroxide (two equivalents of ammonia per anhydride), and water were placed in the jar. The jar was then capped and placed in a constant temperature bath. The bath itself was then shaken. It was necessary to crack the caps one time for those samples being run at 70–90° C. before reaching the temperature to release pressure buildup. Samples were withdrawn every hour and the Brookfield viscosity immediately measured at 25° C. When equilibrium viscosity was attained no further measurements were taken. After a minimum of seven hourly readings, those samples not yet at equilibrium were maintained at constant temperatures in a constant temperature oven. The viscosities were measured after one, two, three and four days and one week and two weeks. For the viscosity measurements at one day and beyond, once the samples were solubilized, shaking was discontinued. The data in Table II represents this kinetic study. In the Table, the time to a stable viscosity is the time it took to reach equilibrium at the temperature indicated while the final viscosity is the viscosity of the ammonia cut at equilibrium. A dash in the Table indicates that the experiment was not run. Uncut indicates that a solution never was obtained within the two week period, while 2 wks+ indicates that after two weeks the samples had yet to come to equilibrium. In this case the viscosity is the viscosity at the end of the two week period.

As is apparent from the data, there is a break in time to stable viscosity between runs G and H and between runs R and S. There is a further, less well-defined, break between runs I and J. Although higher energy levels are needed to solubilize the $C_{30+}$ terpolymers, these materials do go into solution within a reasonable time, i.e., within a day.

EXAMPLE 4

$C_{10}/C_{20-24}$/MAH, 0.2/0.8/1.0, 36.2 g (0.1 mole) was dissolved in 100 g of an isoparafinic hydrocarbon fraction with a boiling range of 116–134° C. (Isopar E, commercially available from Exxon Company, Houston, Texas). To this solution was added 8.9 g (0.1 mole) of dimethylaminoethanol. After allowing the system to sit for 30 minutes, the Isopar E was evaporated off. The resulting product, the half ester which is also an amphoteric copolymer, was now soluble in water. A cast film of a 10% aqueous solution, with 10 weight percent KP-140 as a plasticizer, gave a clear film which was sensitive to water. Heating the film at 150° C. for 10 minutes resulted in a film which was now highly resistant to attack by water.

EXAMPLE 5

In a variation of the procedure described in example 4, each of the polymers in the $C_{20-24}$ series was converted into the dimethylaminoethanol derivative. Ten grams of the polymer was dissolved in 90 g of an isoparafinic hydrocarbon solvent, having an approximate boiling range of from 156–176° C. (Isopar G, commercially available from Exxon Company, Houston, Texas). In the case of $C_{10}/C_{20-24}$/MAH, 1.0/0/1.0 and 0.9/0.1/1.0, solubility in Isopar G was too poor to facilitate a good reaction. In this case, solubility and subsequent reaction in toluene was employed.

The solvent was then stripped off and the dried polymer dissolved in water at 10% solids. Cast films were evaluated on glass. All films were clear; however, 5–10% KP-140 was required to give film continuity. Data attained is set forth in Table III.

TABLE II

| Run | Time to Stable Viscosity 30° C. | 50° C. | 70° C. | 90° C. | Final Viscosity, cps. 30° C. | 50° C. | 70° C. | 90° C. |
|-----|---------|---------|---------|---------|---------|---------|---------|---------|
| A | 1 hr. | 1 hr. | 1 hr. | — | 3.7 | 3.7 | 3.6 | — |
| B | 3 hrs. | 2 hrs. | 1 hr. | — | 3.7 | 3.8 | 3.7 | — |
| C | 4 hrs. | 3 hrs. | 1 hr. | — | 3.9 | 3.9 | 3.9 | — |
| D | 5 hrs. | 3 hrs. | 1 hr. | — | 4.0 | 4.0 | 3.9 | — |
| E | 5 hrs. | 3 hrs. | 1 hr. | — | 4.1 | 4.0 | 4.0 | — |
| F | 5 hrs. | 3 hrs. | 1 hr. | — | 4.7 | 4.2 | 4.4 | — |
| G | 5 hrs. | 3 hrs. | 3 hrs. | — | 6.0 | 4.8 | 4.4 | — |
| H | 2 wks+ | 1 wk. | 1 day | — | 7.2 | 6.0 | 4.2 | — |
| I | 2 wks+ | 2 wks+ | 1 day | — | 640 | 6.9 | 4.4 | — |
| J | 2 wks+ | 2 wks+ | 1–2 wks. | — | 5100 | 11.8 | 3.9 | — |
| K | Uncut | 2 wks+ | 1–2 wks. | — | — | 11.0 | 4.4 | — |
| L | — | 1 hr. | 1 hr. | 1 hr. | — | 3.9 | 3.6 | 3.9 |
| M | — | 2 hrs. | 3 hrs. | 1 hr. | — | 4.0 | 3.6 | 3.9 |
| N | — | 5 hrs. | 3 hrs. | 1 hr. | — | 5.2 | 4.3 | 4.2 |
| O | — | 7 hrs. | 3 hrs. | 1 hr. | — | 6.3 | 4.4 | 4.4 |
| P | — | 7 hrs. | 4 hrs. | 1 hr. | — | 6.0 | 4.7 | 4.5 |
| Q | — | 2 wks+ | 7 hrs. | 2 hrs. | — | 5.9 | 5.2 | 4.6 |
| R | — | 2 wks+ | 2 wks | 1 day | — | 76.0 | 5.1 | 4.2 |
| S | — | Uncut | 2 wks+ | 1 day | — | — | 6.9 | 4.4 |
| T | — | Uncut | 2 wks+ | 2 wks | — | — | 286 | 4.0 |
| U | — | Uncut | 2 wks+ | 2 wks | — | — | 61 | 4.9 |
| V* | — | Uncut | Uncut | *2 wks+ | — | — | — | 4.5 |

*Sample V-8.4 cps after 2 weeks, 4.5 cps after remaining at room temperature for an additional month.

TABLE III

| Composition of Starting Polymer | | | pH of Aqueous Solution | Appearance of Aqueous Solu. | Appearance of Aqueous Solu. with 10% KP-140 |
|---|---|---|---|---|---|
| C10 | C20-24 | MAH | | | |
| 1.0 | 0 | 1.0 | 6.90 | Clear | Clear |
| .9 | .1 | 1.0 | 6.55 | Clear | Clear |
| .8 | .2 | 1.0 | 6.13 | Transparent | Clear |
| .7 | .3 | 1.0 | 6.23 | Cloudy | Clear |
| .6 | .4 | 1.0 | 6.62 | Opaque | Clear |
| .5 | .5 | 1.0 | 6.78 | Opaque | Clear |
| .4 | .6 | 1.0 | 6.95 | Opaque | Clear |
| .3 | .7 | 1.0 | 6.78 | Opaque | Translucent |
| .2 | .8 | 1.0 | 6.67 | Opaque | Cloudy |
| .1 | .9 | 1.0 | 6.78 | Opaque | Opaque |
| 0 | 1.0 | 1.0 | 6.70 | Opaque | Opaque |

EXAMPLE 6

Polymers prepared using the procedure of Example 1, with compositions as shown in Tables IV and V from two series were dissolved in isoparafinic hydrocarbon solvent (Isopar G) as 10% solutions. Brookfield viscosities were run and the results are shown in Tables IV and V.

TABLE IV

| Composition | | | Brookfield |
|---|---|---|---|
| C10 | C20-24 | MAH | Viscosity (cps.) |
| 1.0 | 0 | 1.0 | Undissolved |
| .9 | .1 | 1.0 | Undissolved |
| .8 | .2 | 1.0 | Gel |
| .7 | .3 | 1.0 | 1450 |
| .6 | .4 | 1.0 | 3.7 |
| .5 | .5 | 1.0 | 4.2 |
| .4 | .6 | 1.0 | 4.0 |
| .3 | .7 | 1.0 | 3.7 |
| .2 | .8 | 1.0 | 3.4 |
| .1 | .9 | 1.0 | 3.4 |
| 0 | 1.0 | 1.0 | 3.3 |

TABLE V

| Composition | | | Brookfield |
|---|---|---|---|
| C10 | C30+ | MAH | Viscosity (cps.) |
| .9 | .1 | 1.0 | Undissolved |
| .8 | .2 | 1.0 | 5.6 |
| .7 | .3 | 1.0 | 5.0 |
| .6 | .4 | 1.0 | 4.7 |
| .5 | .5 | 1.0 | 3.8 |
| .4 | .6 | 1.0 | 3.5 |
| .3 | .7 | 1.0 | 3.5 |
| .2 | .8 | 1.0 | 3.4 |
| .1 | .9 | 1.0 | 3.7 |
| 0 | 1.0 | 1.0 | 4.0 |

What I claim is:

1. A terpolymer of from about 49–60 mole percent maleic anhydride, from about 10–40 mole percent of at least 1-alkene, having from 4–16 carbon atoms, and from about 40–10 mole percent of at least 1- alkene, having at least 18 carbon atoms.

2. The terpolymer of claim 1, having a number average molecular weight within the range of from about 3,000–15,000.

3. The terpolymer of claim 1, wherein the lower alkene is selected from the group consisting of 1-butene, 1-pentene, 1-hexene, 1-heptene, 1-octene, 1-nonene, 1-decene and mixtures thereof.

4. The terpolymer of claim 1, wherein the lower 1-alkene is selected from the group consisting of 1-octene, 1-decene and mixtures thereof.

5. The terpolymer of claim 1, wherein the higher 1-alkene is a mixture of $C_{30+}$ 1-alkenes.

6. The terpolymer of claim 1, wherein the higher alkene is a mixture of 1-alkenes, having from 20–24 carbon atoms.

7. The terpolymer of claim 1 wherein the composition contains from 49–55 mole percent maleic anhydride, from about 20–40 mole percent lower 1-alkene and from 10–30 mole percent higher 1-alkene.

* * * * *

UNITED STATES PATENT AND TRADEMARK OFFICE
CERTIFICATE OF CORRECTION

PATENT NO. : B1 4,358,573

DATED : November 15, 1983

INVENTOR(S) : Calvin J. Verbrugge

It is certified that error appears in the above-identified patent and that said Letters Patent is hereby corrected as shown below:

Claim 14, line 2, "from" should read --from about--.
Claim 14  line 4, "from" should read --from about--.

Signed and Sealed this

Seventeenth Day of September 1985

[SEAL]

Attest:

DONALD J. QUIGG

Attesting Officer

Commissioner of Patents and
Trademarks—Designate

REEXAMINATION CERTIFICATE (136th)

United States Patent [19]

Verbrugge

[11] B1 4,358,573

[45] Certificate Issued    Nov. 15, 1983

[54] WAXY MALEIC ANHYDRIDE ALPHA OLEFIN TERPOLYMERS

[75] Inventor: Calvin J. Verbrugge, Racine County, Wis.

[73] Assignee: S. C. Johnson & Son, Inc., Racine, Wis.

Reexamination Request:
No. 90/000,361, Apr. 21, 1983

Reexamination Certificate for:
Patent No.: 4,358,573
Issued: Nov. 9, 1982
Appl. No.: 268,432
Filed: May 29, 1981

[51] Int. Cl.³ .................................. C08F 220/08

[52] U.S. Cl. ........................... 526/272; 524/549
[58] Field of Search ................ 526/272; 252/56 D

[56] References Cited

U.S. PATENT DOCUMENTS 4,151,069  4/1979  Rossi .................................. 208/33
4,240,916  12/1980  Rossi .............................. 252/56 D

FOREIGN PATENT DOCUMENTS 1525114  9/1978  United Kingdom .

*Primary Examiner*—Paul R. Michl

[57] ABSTRACT

Terpolymers of maleic anhydride and mixtures of lower alkenes and higher alkenes have waxy properties, yet are readily dispersible and have low viscosities.

REEXAMINATION CERTIFICATE ISSUED UNDER 35 U.S.C. 307.

WAXY MALEIC ANHYDRIDE ALPHA OLEFIN TERPOLYMERS

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claim 6 having been finally determined to be unpatentable, is cancelled.

Claim 1 is determined to be patentable as amended:

Claims 2-5 and 7, dependent on amended claims, are determined to be patentable.

New claims 8-14 are added and determined to be patentable.

1. A terpolymer of from about 49-60 mole percent maleic anhydride, from about 10-40 mole percent of at least *a lower* 1-alkene, having from 4-16 carbon atoms, and from about 40-10 mole percent of at least *a higher* 1-alkene, having at least [18] *30* carbon atoms.

8. *An aqueous composition of a solubilized terpolymer of from about 49-60 mole percent maleic anhydride, from about 10-40 mole percent of at least a lower 1-alkene, having from 4-16 carbon atoms, and from about 40-10 mole percent of at least a higher 1-alkene, having at least 18 carbon atoms.*

9. *The aqueous composition of claim 8, wherein the terpolymer has a number average molecular weight within the range of from about 3,000-15,000.*

10. *The aqueous composition of claim 8, wherein the lower alkene of the solubilized terpolymer is selected from the group consisting of 1-butene, 1-pentene, 1-hexene, 1-heptene, 1-octene, 1-nonene, 1-decene and mixtures thereof.*

11. *The aqueous composition of claim 8, wherein the lower 1-alkene of the solubilized terpolymer is selected from the group consisting of 1-octene, 1-decene and mixtures thereof.*

12. *The aqueous composition of claim 8, wherein the higher 1-alkene of the solubilized terpolymer is a mixture of $C_{30}+$ 1-alkenes.*

13. *The aqueous composition of claim 8, wherein the higher alkene of the solubilized terpolymer is a mixture of 1-alkenes, having from 20-24 carbon atoms.*

14. *The aqueous composition of claim 8, wherein the terpolymer contains from 49-55 mole percent maleic anhydride, from about 20-40 mole percent lower 1-alkene and from 10-30 mole percent higher 1-alkene.*

* * * * *